Oct. 21, 1930.  J. A. SWEENEY  1,779,265
OPHTHALMIC MOUNTING
Filed Aug. 8, 1928   2 Sheets-Sheet 1
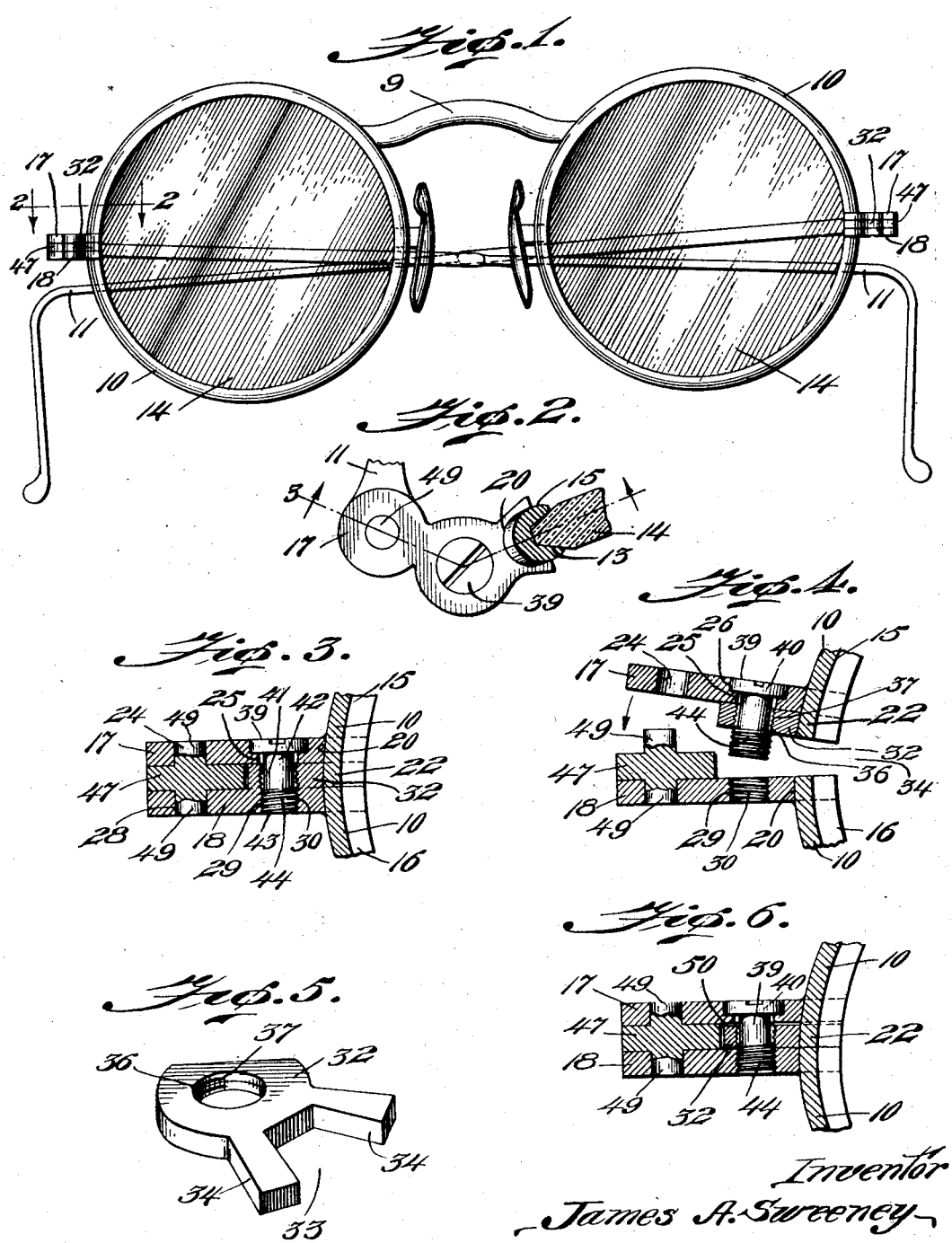
Inventor
James A. Sweeney
By Horatio E. Bellows
Attorney

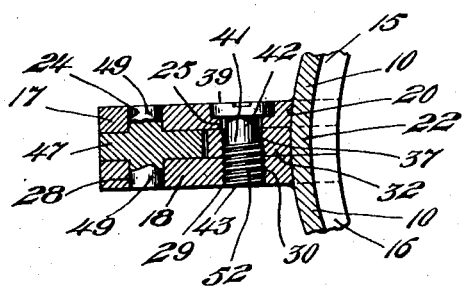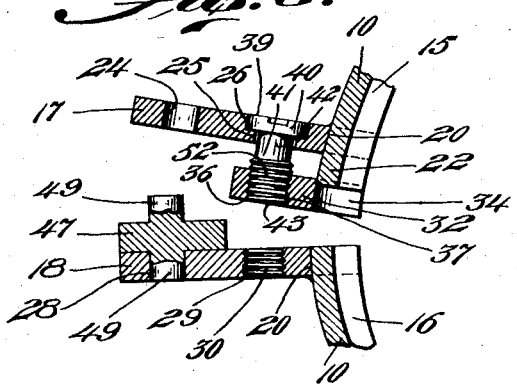

Patented Oct. 21, 1930

1,779,265

UNITED STATES PATENT OFFICE

JAMES A. SWEENEY, OF PROVIDENCE, RHODE ISLAND

OPHTHALMIC MOUNTING

Application filed August 8, 1928. Serial No. 298,195.

My invention relates to ophthalmic mountings including eye-glasses and spectacles.

When, for the purposes of substitution of lenses or temple bars or for other purposes, it is necessary to loosen the screw that binds the end pieces of the resilient eye wire segments or split rims, the latter suddenly spring apart with great force immediately the screw disengages a single one of the pair of end pieces and discharges the binding screw like a missile so that it is lost.

One object of my invention is to prevent the above occurrence and retain the screw against accidental forcible escape during the release of the rim segments.

Further objects of the present invention are to prevent the loosening or loss of the temple pivoting members which characterize the use of temple dowels, and to increase the tension of the end pieces upon the temple butts.

A final purpose is to effect these purposes in a strong and inexpensive structure and by a simple means.

To the above ends essentially my invention consists in such parts and in such combinations of parts as fall within the scope of the appended claims.

In the accompanying drawings which form a part of this specification,

Figure 1 is a front elevation of an ophthalmic mounting embodying my invention,

Figure 2, a partial section taken on line 2—2 of Figure 1,

Figures 3 and 4, sections taken on line 3—3 of Figure 2, showing the end pieces in engaged and disengaged positions respectively, Figure 5, a detail view of a guard plate, Figure 6, a view corresponding with that of Figure 3 showing the parts prior to finally tightening the clamping screw, and Figures 7 and 8, sections corresponding with Figures 3 and 4 respectively of a modified form of my invention.

Like characters of reference indicate like parts throughout the views.

As herein shown 9 is the bridge, 10 the resilient transversely split or divided rims, and 11 the temples or temple bars of a pair of spectacles or eyeglasses, wherein the rims are provided with the usual internal annular grooves 13 for the reception of the tapering peripheries of the lenses 14 and comprise the resilient wings 15 and 16.

The end pieces 17 and 18 are in this instance provided with the usual inner end openings 20 to receive the members 10 to which they are brazed, or the end pieces may, if preferred, be integral with the member 10. One of the end pieces, 17, is spaced from the extremity of the rim wing 15, while the companion end piece 18 is located at the extremity of the adjacent wing 16. Hence when the rims are closed upon the lenses the end pieces are spaced from each other a distance equal to the length of the portion 22 of the wing 15 projecting beyond the end piece 17.

One of the end pieces 17 has a perforation 24 and a smooth opening 25 for the reception of the temple pivot member and the binding screw respectively. The upper end 26 of the opening is in this instance of enlarged diameter or countersunk for the reception of the head of the binding screw. The companion end piece 18 is provided with a correspondingly located perforation 28 and opening 29. The perforation 28 is smooth for the reception of the pivot member, and the opening 29 is provided with a thread 30. Between the end pieces and abutting the piece 17 or integral therewith or fixed thereto, is a guard plate 32 composed of either metallic or non-metallic material, of a thickness substantially equivalent to the projecting portion 22 of the rim wing. This plate is provided with an end or peripheral notch 33, forming in this instance resultant diverging fingers 34. The projecting portion 22 of the eye wire or rim is loosely received in the notch or recess 33 whereby the plate 32 is locked against rotation. The plate is provided also with an aperture 36 having a screw thread 37 which registers with the circular openings 25 and 29 and which is of the same diameter. The pitch of the thread 37 is the same as that of the thread 30.

The binding screw 39 comprises a flat screw head 40, and a cylindrical shank 41 whose upper portion 42 is smooth or unthreaded, and whose lower portion 43 is provided with a laterally projecting screw thread 44. The lower portion 43 of the shank 41 including the thread is of greater diameter than its upper portion 42 and its thread is adapted to engage the threads 30 and 37 of the end piece 18 and of the plate 32 respectively, and pass loosely through the smooth opening 25 in the end piece 17.

Each temple 11 includes a flat forward end portion or butt 47 provided with an integral pivot member or trunnions 49 rotatable in the openings 24 and 28 of the end pieces.

In normal clamped position the parts are as shown in Figure 3. When, however, it is desired to temporarily open the end pieces for substitution of lenses or temples or for any other purpose the operator applies a screw driver to the head 40 of the binding screw and turns the latter thereby moving the end piece 18 away from the other parts in the direction of the arrow shown in Figure 4 until the former is released from the screw and springs away. During the described turning of the screw the plate 32 remains substantially in contact with the member 17, its lower face resting upon the shoulder furnished by the laterally projecting screw thread 44 and thus locks the screw against accidental escape when the end pieces spring apart. The screw, if desired, may be finally removed from engagement with both the plate 32 and end piece 17 by leading the screw, that is to say, by turning the screw while manually applying pressure to its lower end. The final unscrewing operation is facilitated by reason of the fact that the plate 32 is anchored against rotation by the presence of the rim 10 in the notch 33.

The thickness of the plate 32 is a few thousandths of an inch thinner than the temple butt 47. This feature is graphically shown at 50 in Figure 6 where the space between the plate and end pieces is grossly exaggerated for illustrative purposes, since the space is not visually appreciable. When the binding screw 39 is ultimately screwed down to its final position the members 17 and 18 are brought into snug contact with the plate 32 and the frictional engagement of the members 17 and 18 with the temple portion 47 is increased so that a proper and secure tension of the temple is insured. The integral connection of the temple pivot members with the temple butts makes loss of the former impossible and eliminates the erroneous fitting and expensive construction involved in the use of temple dowel pins.

In Figures 7 and 8 the thread 52 of the screw 39 is shown lengthened to such a degree as to normally extend partially into the plate 32 and engage the thread 37 therein. In this construction the screw is retained against escape after the release of the screw from the end piece 18 by reason of the interengagement of the threads 37 and 52. Some but not all of the advantages of the structure shown in Figure 3 are present in the structure shown in Figure 7, hence the former construction is preferred.

I claim:—

1. In an ophthalmic mounting, a split rim, end pieces upon the rim provided with openings for a binding screw, one of said openings being provided with a thread, a guard plate between the end pieces provided with a threaded opening registering with the openings in the end pieces, and a binding screw in the end pieces and plate provided with a thread normally engaging the thread in the end piece opening only, and engageable in the threaded opening of the plate.

2. In an ophthalmic mounting, a resilient split rim, end pieces upon the rim, an independent guard plate between the end pieces provided with a notch for the reception of the rim and provided with a threaded opening, and a binding screw in the end pieces traversing the opening and provided with a thread engageable in the threaded opening.

3. In an ophthalmic mounting, a split rim comprising two resilient wings, an end piece fast to one wing and spaced from the end of the wing provided with an opening for the reception of a binding screw, a second end piece fast to the end of the second wing provided with an opening, a guard plate intermediate the end plates provided with a peripheral notch for the reception of the end portion of the first wing projecting beyond the first end piece and provided with a threaded opening, the opening of one of the end pieces being also provided with a thread, and a binding screw extending through all the openings and provided with a thread engaging the thread in the end piece opening, and engageable in the threaded opening of the plate.

4. In an ophthalmic mounting, a resilient split rim, end pieces upon the rim, one of said end pieces being provided with a perforation and with an opening, the other of said end pieces being provided with a perforation and with an opening provided with a thread, an independent guard plate between the end pieces provided with an opening and with a thread in the opening, a binding screw in the three openings comprising a head engaging the first end piece, a shank, and a laterally projecting thread upon the shank engaging the thread in the second mentioned end piece and engageable with the thread of the opening in the plate, a temple butt between the end pieces of greater thickness than the plate and pivot members upon the butt in the perforations.

In testimony whereof I have affixed my signature.

JAMES A. SWEENEY.